No. 853,267. PATENTED MAY 14, 1907.
M. SCHMITT.
WEED EXTERMINATOR.
APPLICATION FILED OCT. 6, 1905.
3 SHEETS—SHEET 1.
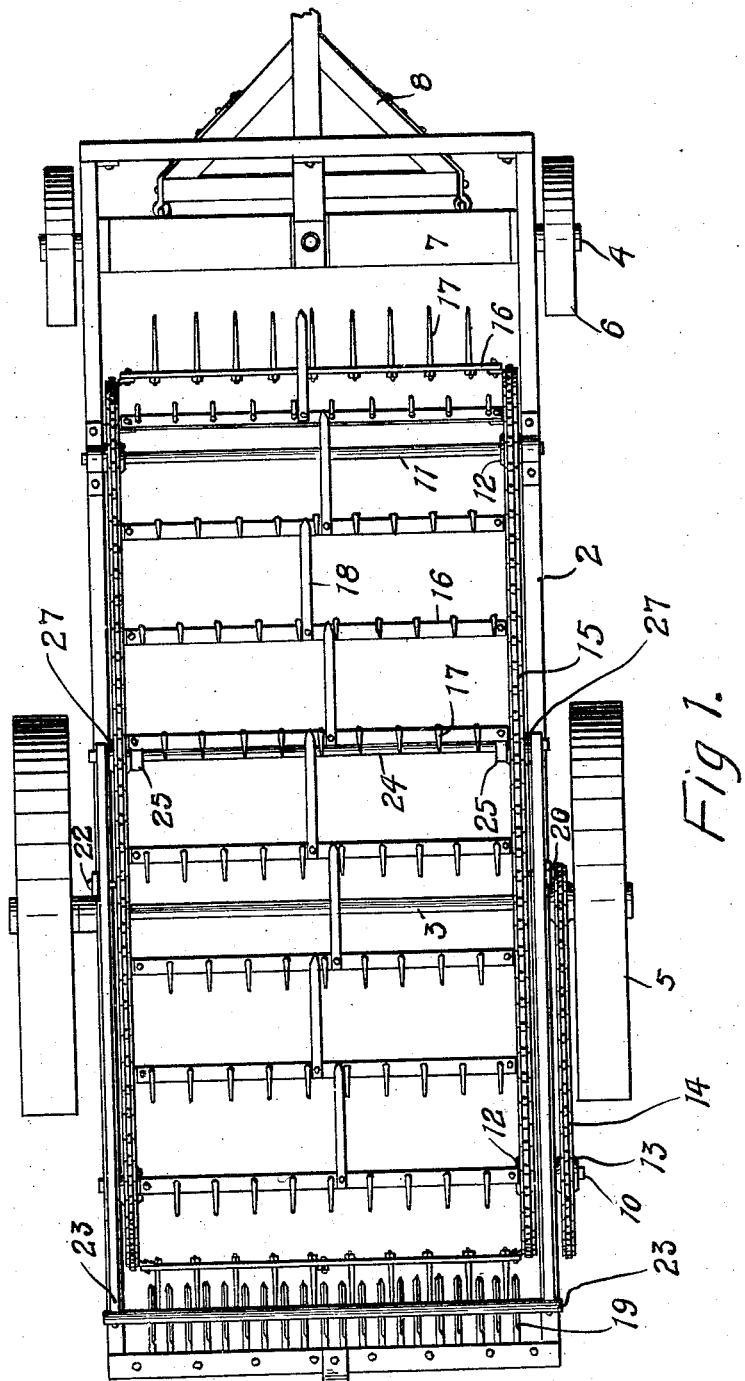
WITNESSES.
INVENTOR
MATHIES SCHMITT.
BY Paul & Paul
HIS ATTORNEYS.

No. 853,267. PATENTED MAY 14, 1907.
M. SCHMITT.
WEED EXTERMINATOR.
APPLICATION FILED OCT. 6, 1905.
3 SHEETS—SHEET 2.
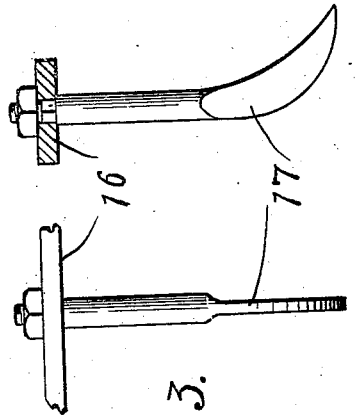
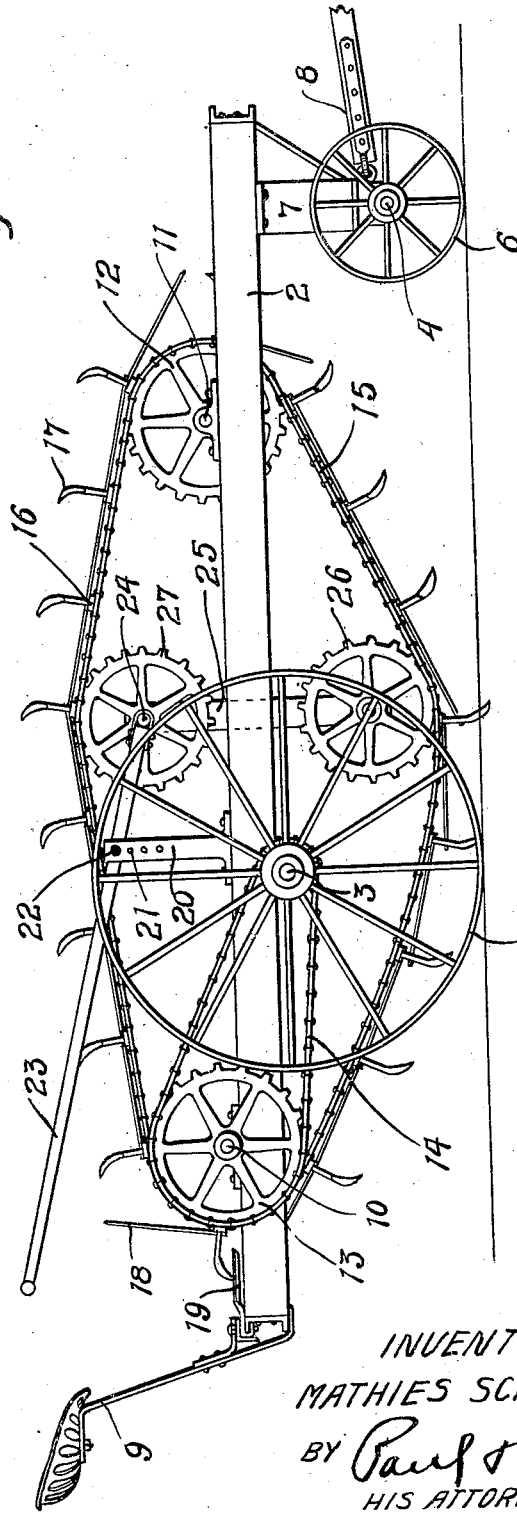
INVENTOR
MATHIES SCHMITT.

No. 853,267. PATENTED MAY 14, 1907.
M. SCHMITT.
WEED EXTERMINATOR.
APPLICATION FILED OCT. 6, 1905.
3 SHEETS—SHEET 3.
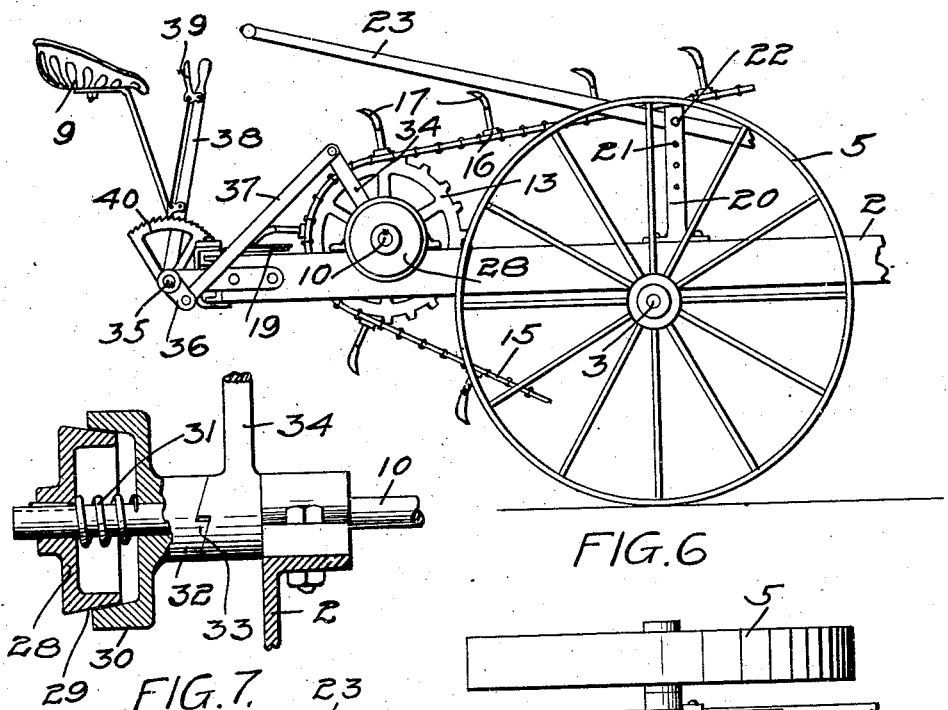
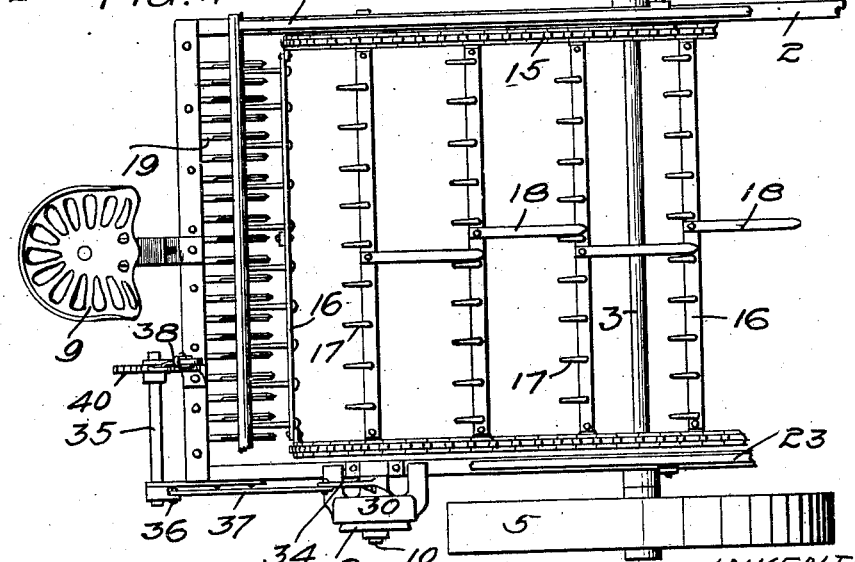
WITNESSES.
INVENTOR
MATHIES SCHMITT.
BY Paul & Paul
HIS ATTORNEYS

UNITED STATES PATENT OFFICE.

MATHIES SCHMITT, OF AUSTIN, MINNESOTA.

WEED-EXTERMINATOR.

No. 853,267.  Specification of Letters Patent.  Patented May 14, 1907.

Application filed October 6, 1905. Serial No. 281,638.

*To all whom it may concern:*

Be it known that I, MATHIES SCHMITT, of Austin, Mower county, Minnesota, have invented certain new and useful Improvements in Weed-Exterminators, of which the following is a specification.

My invention relates to agricultural implements, and the object of the invention is to provide a machine for cutting up and destroying weeds, particularly "quack grass," and is designed as an improvement over the machine shown and described in Letters Patent of the United States No. 794,318, issued to me July 11, 1905.

The object of my present invention is to simplify and reduce the cost of manufacturing the machine covered by my patent above referred to.

The invention consists generally in various constructions and combinations, all as hereinafter described and particularly pointed out in the claims.

In the accompanying drawings forming part of this specification, Figure 1 is a plan view of a weed exterminator embodying my invention. Fig. 2 is a side elevation of the same. Figs. 3 and 4 are details of the knives or weed cutters. Fig. 5 is a plan view illustrating a friction device for controlling the travel of the belt. Fig. 6 is a side elevation of the rear end of the machine showing the position of the friction device thereon. Fig. 7 is a detail sectional view of the friction device.

In the drawing, 2 represents a frame of suitable material, preferably channel bar iron, supported on axles 3 and 4 having carrying wheels 5 and 6. A bolster 7 is provided between the forward end of the frame and the axle 6, and a suitable draft appliance 8 is attached to the said axle 6. A seat 9 is provided at the rear end of the frame. Mounted upon the frame 2 are transversely arranged shafts 10 and 11, whereon sprocket wheels 12 are mounted on each side of the machine. A sprocket wheel 13 is secured on the shaft 10 and connected with one of the carrying wheels 5 by a belt 14. Belts 15 pass over the sprocket wheels 12 on each side of the machine, and are connected by cross slats 16, whereon a series of curved teeth or knives 17 are secured. The points of these knives are adapted to dig into the soil and cut the roots of the weeds, and the knives are sufficiently near together to thoroughly destroy all the weeds in the path of the machine and at the same time loosen and pulverize the soil. The knife belt being driven from one of the carrying wheels will have a movement independent of its travel with the machine, and hence as the machine moves over the field the position of the knives will be constantly changing owing to the movement of the belt, and the travel of the belt will be so timed that the knives will remain in the soil for some little distance and thoroughly cut up and destroy the roots of the weeds and quack grass. The bars 16 are each provided near their center with arms 18, which are secured at one end to a bar and project forwardly and bear upon the contiguous bar to prevent it from turning when its knives strike the soil. At the rear end of the frame I provide a series of fingers 19 projecting forwardly into the path of the knives or teeth 17 to clean off any refuse material that may be brought up thereby. Near the middle of the machine frame, on each side, I provide standards 20 having a series of holes 21 therein, and pins 22 are vertically adjustable in said holes and carry a frame 23 upon which a shaft 24 is mounted. Bars 25 depend from the shaft 24 and carry wheels 26 at their lower ends, which are adapted to bear upon the traveling belt and press the teeth into the soil. Similar wheels 27 are mounted on the shaft 24, in position to engage the belt for the purpose of drawing it taut and raising its lower portion away from the ground when the wheels 26 are lifted by the oscillation of the frame 23. The driver of the machine sits within convenient reach of the frame 23, and can raise or lower the wheels 26 and 27 and control the engagement of the teeth with the soil.

In Figs. 5, 6 and 7 I have shown a modification in the construction of the machine, which consists in dispensing with the driving means leading from the carrying wheels of this application and the engine of my patent above referred to, and allowing the belt to be operated merely by the contact of its teeth with the ground as the machine moves along. Where the belt is driven from the traction wheels its speed will be constant, and the teeth entering the soil will travel backward proportionately with the movement of the machine forward. By omitting the driving means, however, the belt will travel slower than the machine being governed by the character of the soil and by the friction of its supporting shafts in their bearings. To enable the operator to have further control over the movement of this belt, I provide a hub 28 keyed on the shaft 10, and provided with a cone-shaped or tapered surface 29 with which a cup 30 having a correspondingly shaped socket is adapted to contact. The cup 30 is loose on the shaft and is normally held out of contact with the hub by a spring 31. A hub 32 is provided for said cup having a series of teeth 33, which are adapted to be engaged by corresponding teeth on the hub of a lever 34 also mounted on said shaft and having an oscillating forward and back movement thereon. The forward movement of this lever will have the effect of rotating the hub 32 and sliding the cup 30 into engagement with the surface 29, whereupon the shaft will be retarded in its revolution and the speed of the belt decreased. A shaft 35 is mounted on the rear end of the frame and provided with an arm 36 connected by a link 37 with the lever 34. An operating lever 38 is mounted on the shaft 35 and provided with the usual latch device 39 to engage the quadrant 40. The lever 38 is within convenient reach of the operator of the machine, and by moving the same back and forth he can readily increase or decrease the speed of movement of the belt. By the use of this attachment the operator will have perfect control over the traveling belt, and can easily regulate the distance a tooth travels in the soil, and whenever necessary can entirely throw out the friction device and allow the belt to run free, as when the machine is traveling over very rough ground or the teeth engage some obstruction in the soil.

A machine of this kind will be simple and inexpensive to manufacture, and very strong and durable. It cannot easily get out of order, and has been found by actual experience to be very efficient for the purpose designed.

I claim as my invention:

1. The combination, with a frame, having carrying wheels and a draft connection, of a belt supported in said frame, a series of knives arranged in transverse rows on said belt and having cutting edges adapted to dig into the soil as the machine is drawn along, said knives traveling backward at a slower speed because of their engagement with the soil than the forward travel of the machine, and means for regulating the speed of travel of said belt, substantially as described.

2. The combination, with a frame, having carrying wheels and a draft connection, of a belt supported by said frame, a series of knives arranged in transverse rows at intervals on said belt and having cutting edges adapted to dig into the soil as the machine is drawn over the field, said knives moving backward, through their engagement with the soil, at a slower speed than the forward travel of the machine, and a friction clutch device for regulating the speed of said belt, substantially as described.

3. The combination with a frame having carrying wheels, and a draft connection, of a belt supported in said frame, a series of knives arranged in transverse rows on said belt, and having cutting edges adapted to dig into the soil as the machine is drawn along, said knives traveling backward at a slower speed because of their engagement with the soil than the forward travel of the machine, and one row of knives being on the point of leaving the soil as the row ahead enters the same, and there being only one row in working engagement with the soil at one time, whereby dragging of the cut and uprooted grass is prevented, substantially as described.

4. The combination with a frame having carrying wheels, and a draft connection, of a belt supported by said frame, a series of knives arranged in transverse rows at intervals on said belt and having cutting edges adapted to dig into the soil as the machine is drawn over the field, standards mounted on said frame, bars 23 pivoted at a point intermediate to their ends on said standards, a shaft 24 carried by said bars, a frame mounted on said shaft, and sprocket wheels carried by said frame and adapted to engage the upper and lower sections of said belt for the purpose specified.

5. The combination, with a frame having carrying wheels, and a draft connection, of a belt supported in said frame, a series of knives arranged in transverse rows on said belt and having cutting edges adapted to dig into the soil as the machine is drawn along, standards mounted on said frame, bars pivoted on said standards and vertically adjustable thereon, and a frame carried by said bars and having means adapted to engage said belt for raising the upper section thereof or forcing the teeth of the lower section into the soil, substantially as described.

6. The combination, with a frame having carrying wheels and a draft connection, of a belt supported in said frame having a series of transverse slats, and knives mounted thereon, said slats being arranged parallel with one another at intervals, and arms 18 secured on said slats and having free ends adapted to bear on the contiguous slats. substantially as described.

7. The combination, with a frame having carrying wheels and a draft connection, of a belt carried by said frame, a series of knives carried by said belt and having cutting edges adapted to dig into the soil as the machine is drawn along, said knives traveling slowly backward as their points contact with the soil, and means for retarding the backward movement of said knives the travel of said knives toward the rear of the machine being slower than their forward travel with the machine whereby the forward movement of the machine will have the effect of forcing the knives into the soil to cut and dig out the grass roots, substantially as described.

In witness whereof, I have hereunto set my hand this 30th day of September 1905.

MATHIES SCHMITT.

Witnesses:
 A. W. ALLEN,
 MATTIE E. HOLLISTER.